United States Patent
Levy

(10) Patent No.: US 7,689,532 B1
(45) Date of Patent: Mar. 30, 2010

(54) USING EMBEDDED DATA WITH FILE SHARING

(75) Inventor: Kenneth L. Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 524 days.

(21) Appl. No.: 09/620,019

(22) Filed: Jul. 20, 2000

(51) Int. Cl.
G06F 17/30 (2006.01)

(52) U.S. Cl. ............... 707/1; 707/9; 707/10; 709/217; 713/176; 715/751

(58) Field of Classification Search .......... 707/1–10, 707/100–104.1, 200–206; 709/217, 219, 709/229; 713/176, 180, 167, 168, 179; 715/751; 382/100
See application file for complete search history.

(56) References Cited

U.S. PATENT DOCUMENTS

| | | |
|---|---|---|
| 5,410,598 A | 4/1995 | Shear |
| 5,519,778 A | 5/1996 | Leighton et al. |
| 5,629,980 A | 5/1997 | Stefik et al. |
| 5,646,997 A | 7/1997 | Barton |
| 5,646,999 A | 7/1997 | Saito |
| 5,765,152 A | 6/1998 | Erickson |
| 5,809,317 A | 9/1998 | Kogan et al. ............. 707/501.1 |
| 5,841,978 A | 11/1998 | Rhoads |
| 5,845,281 A | 12/1998 | Benson et al. |
| 5,857,189 A | 1/1999 | Riddle |
| 5,860,074 A | 1/1999 | Rowe et al. |
| 5,862,260 A | 1/1999 | Rhoads ...................... 382/232 |
| 5,943,422 A | 8/1999 | Van Wie et al. |
| 5,956,716 A | 9/1999 | Gruber et al. |
| 5,973,731 A | 10/1999 | Schwab |
| 5,991,876 A | 11/1999 | Johnson et al. |
| 6,112,181 A | 8/2000 | Shear et al. |
| 6,115,741 A | 9/2000 | Domenikos et al. ......... 348/445 |

(Continued)

FOREIGN PATENT DOCUMENTS

EP    715 246    6/1996

(Continued)

OTHER PUBLICATIONS

Tirkel et al., A digital watermark, Nov. 1994, 86-90.*

(Continued)

*Primary Examiner*—Jean B Fleurantin

(57) ABSTRACT

Peer-to-peer file sharing is increasing in popularity on the Internet, faster than any product known in history. Although file-sharing can enable massive piracy, it has many advantages for distribution of information including scalability. Alternatively, file-sharing can be sabotaged with falsified files and used to distribute viruses. To this end, a solution that maintains the scalability of file-sharing and promotes reliability is proposed. The solution involves embedding data within the file or content and using the data to identify the content, demonstrate its completeness and lack of viruses, and verify the file can be shared. The embedded data can be checked when the file is registered with the database for sharing, and before or while the file is being uploaded and/or downloaded. Ideally, the embedded data is added at the time of creation for the file. The embedded data may include a watermark and be linked to other copy management systems, such as those proposed in DVD and SDMI. Finally, the embedded data can be used to enable purchases of files that owners do not have rights to share.

38 Claims, 1 Drawing Sheet

U.S. PATENT DOCUMENTS

| | | | |
|---|---|---|---|
| 6,122,403 | A | 9/2000 | Rhoads .................. 382/233 |
| 6,141,753 | A | 10/2000 | Zhao et al. |
| 6,185,683 | B1 | 2/2001 | Ginter et al. |
| 6,199,076 | B1 | 3/2001 | Logan et al. ............... 707/501 |
| 6,260,040 | B1 | 7/2001 | Kauffman et al. |
| 6,366,907 | B1 | 4/2002 | Fanning |
| 6,425,081 | B1 * | 7/2002 | Iwamura ................. 713/176 |
| 6,430,558 | B1 * | 8/2002 | Delano ..................... 707/5 |
| 6,466,670 | B1 | 10/2002 | Tsuria et al. |
| 6,477,707 | B1 | 11/2002 | King et al. |
| 6,519,352 | B2 | 2/2003 | Rhoads |
| 6,587,821 | B1 | 7/2003 | Rhoads |
| 6,658,568 | B1 | 12/2003 | Ginter et al. |
| 6,697,944 | B1 | 2/2004 | Jones |
| 6,711,559 | B1 * | 3/2004 | Kogota et al. .................. 707/1 |
| 6,768,808 | B2 | 7/2004 | Rhoads |
| 6,807,534 | B1 | 10/2004 | Erickson |
| 6,928,545 | B1 | 8/2005 | Litai |
| 6,947,909 | B1 | 9/2005 | Hoke |
| 6,978,370 | B1 | 12/2005 | Kocher |
| 7,095,871 | B2 * | 8/2006 | Jones et al. ............... 382/100 |
| 7,213,005 | B2 | 5/2007 | Mourad |
| 7,233,948 | B1 | 6/2007 | Shamoon |
| 2001/0017885 | A1 | 8/2001 | Asai et al. ................. 375/220 |
| 2001/0042043 | A1 | 11/2001 | Shear |
| 2001/0051996 | A1 | 12/2001 | Cooper et al. ............... 709/217 |
| 2002/0023058 | A1 | 2/2002 | Taniguchi et al. |
| 2002/0033844 | A1 | 3/2002 | Levy et al. |
| 2002/0065832 | A1 | 5/2002 | Mack |
| 2002/0069370 | A1 | 6/2002 | Mack |
| 2002/0071556 | A1 | 6/2002 | Moskowitz et al. ......... 380/210 |
| 2002/0087885 | A1 | 7/2002 | Peled |

FOREIGN PATENT DOCUMENTS

| | | |
|---|---|---|
| KR | 1020000018052 | 4/2000 |
| WO | WO96/31049 | 10/1996 |
| WO | WO 01/05075 | 1/2001 |
| WO | WO 01/16671 | 3/2001 |
| WO | WO 02/07150 | 1/2002 |
| WO | WO02/08945 | 1/2002 |

OTHER PUBLICATIONS

Bartolini et al., Electronic copyright management systems: requirements, players and technologies, Sep. 1-3, 1999, IEEE, 896-898.*
Schneck, Persistent access control to prevent piracy of digital information, Jul. 1999, IEEE, vol. 87, 1239-1250.*
U.S. Appl. No. 09/404,291, filed Sep. 23, 1999, Levy.
U.S. Appl. No. 09/404,292, filed Sep. 23, 1999, Levy.
U.S. Appl. No. 09/503,881, filed Feb. 14, 2000, Rhoads et al.
U.S. Appl. No. 09/563,664, filed May 2, 2000, Levy et al.
U.S. Appl. No. 09/571,422, filed May 15, 2000, Rhoads et al.
U.S. Appl. No. 09/574,726, filed May 18, 2000, Rhoads et al.
U.S. Appl. No. 09/952,384, filed Sep. 11, 2001, Levy.
Zhao, "A WWW Service to Embed and Prove Digital Copyright Watermarks," In Proc. of the European Conf. on Multimedia Applications, Services and Techniques, Louvain-La-Neuve, Belgium, May 1996, 14 pages.
Zhao, "WWW Copyright Labeling & Verification Service," (URL: http://sagittarius.igd.fhg.de:64325) Fraunhofer-IGD, Wilhelminenstr.7, D-64283 Darmstadt, 1 page.
Examiner's Report in EP01954827, dated Jan. 14, 2005, 4 pages.
EP01954827.0, Summons to Attend Oral Proceedings, dated Sep. 20, 2005, 4 pages.
EP01954827.0, Response to EPO with revised claims, dated Jul. 22, 2005.
EP01954827.0, Written Submissions with Main Request and Auxiliary Request, including Auxiliary Request Claims, dated Dec. 23, 2005, 7 pages.
EP01954827.0 Search report dated Sep. 3, 2004., 4 pages.
EP01954827.0, Summons to attend oral proceedings pursuant to Rule 71(1) EPC, dated Jun. 16, 2006, 6 pages.
Voyatzis at al., "Image Watermarking for Copyright protection and Authentication", 13 pages.
EP01954827.0, the minutes of the oral proceedings in accordance with Rule 76(4) EPC, dated Nov. 23, 2006, 9 pages.
EP01954827.0, Communication Under Rule 51(4) EPC informing of intention to grant a European patent, dated Nov. 27, 2006, 39 pages.
Korean Application No. 1020037000844, Notice of Preliminary Rejection mailed Oct. 29, 2007, 12 pages.

* cited by examiner

USING EMBEDDED DATA WITH FILE SHARING

This application relates to Utility patent application Ser. No. 09/404,291 filed Sep. 23, 1999 by Kenneth L. Levy, and Ser. No. 09/404,292 filed Sep. 23, 1999 by Kenneth L. Levy, which are incorporated herein by reference.

TECHNICAL FIELD

The invention relates to file sharing systems for computer networks such as the Internet, and specifically relates to using embedded data in files to enhance such systems.

BACKGROUND AND SUMMARY

With the explosive growth of the Internet, file-sharing programs have evolved. One popular file sharing program is known as Napster, with a user base that has grown to between 10 and 20 million users in 1 year. This is one of the fastest growing products today. Currently, scores of music files can be found from Napster's database of current online users, and downloaded from another user's computer, in a data transfer scheme known as peer-to-peer file sharing. File-sharing is easily extended to all content, such as done with Scour.com.

In the Napster system, web site servers store a database of directories of the digital music libraries on the hard drives of thousands of registered users. The digital files of the songs themselves remain on the users' hard drives. If a user wants a particular song title, he logs onto the Napster web site and types in a search query for the title. Client software on the user's computer connects to the Napster server and receives a list of active users who have the requested file on their computer. In response to selecting a handle name, the client software opens a link between the user's computer and the computer of the selected user, and the client software executing on the two computers transfer the requested file.

Many new file-sharing systems are evolving in which the database is dynamic and not stored on a central server. One example of software with a dynamic database is known as Gnutella. Initially, when a user logs on to the Gnutella network, the user downloads client software from a Gnutella website. Next, the user types in the Internet address of an established Gnutella user (e.g., from a listing available at the web site). The client software then transmits a signal on the network that informs other computers in the Gnutella file sharing network of its network address and connection status. Once a link with the other computer is secure, the other computer informs other computers of the Gnutella network that it has encountered in previous sessions of the user's presence (e.g., address and connection status).

After this initial session, the client software stores the addresses of other computers that it has encountered in the Gnutella network. When the client software is loaded, it recalls these addresses and attempts to reconnect with the other computers located at these addresses in the Gnutella network. The Gnutella software enables users to exchange many types of files. It enables users to issue a search request for files containing a desired text string. In response, the Gnutella clients connected with the user's computer search their respective hard drives for files satisfying the query. The client on the user's computer receives the results (e.g., files and corresponding addresses) and displays a list of them. By clicking on a file item in the user interface, the user instructs the client software to transfer the selected file.

In another file sharing system known as Freenet, the identity of the person downloading and uploading the files can be kept secret. Alternatively, the files could be stored on a central server, but uploaded by users such that the central server does not know the origin or true content of the files.

Unfortunately, the file-sharing methodology also allows massive piracy of any content, such as text, music, video, software, and so on. However, due to the scalability and freedom of distribution with file-sharing, it provides a powerful tool to share information. As such, the is a need for technology that facilitates and enhances authorized file sharing while respecting copyrights.

A few examples of the benefits of file-sharing follow. A file sharing system allows unknown artists to obtain inexpensive and worldwide distribution of their creative works, such as songs, images, writings, etc. As files become more popular, they appear on more of the users' computers; thus, inherently providing scalability. In other words, there are more places from which to download the file and most likely several files exist in close proximity to the downloading computer, thus improving efficiency. In addition, anonymous file-sharing, like FreeNet, foster political debate in places around the world where such debate might trigger reprisals from the government.

Current attempts to curb unauthorized file sharing include enforcement of copyright laws and use of files with content bombs. The current legal enforcement efforts allege that uses of file sharing systems violate copyright laws. Content bombs involve placing files that appear to be the correct content, but contain alternative content or viruses. For example, a MP3 file can have the middle replaced with someone saying "do not copy songs" instead of the desired music. Neither of these solutions will help the Internet grow and improve the quality of life, worldwide.

Current copy management systems allow copying, but block rendering on equipment if the person does not have rights, where rendering only refers to reading a text file, seeing an image, watching a movie, listening to an audio file, smelling a smell file, or executing a software program. Although this can limit piracy within a file-sharing system, it does not improve the system for the user. This lack of improvement stems from the fact that current copy control systems are implemented on the user's computer at the time of importing into the secure system, rendering, or moving to a portable rendering device or media, as described in the Secure Digital Music Initiative's specifications version 1 (available at http://www.sdmi.org, and incorporated by reference). In other words, current copy control systems do not check rights at the time of copying or transfer between computers. For example, the user downloads the protected file, and then finds out that he/she cannot render the file (i.e. play the song). In addition, the user does not know if the file is the correct file or complete until after downloading and attempting to render the file. More specifically, the file is encrypted by a key related to an unique identifier within the user's computer; thus, after copying to a new computer, the file cannot be decrypted. In addition, watermarks can only be used after the file has been decrypted, or to screen open (i.e. decrypted) content for importation into the user's secure management system after the file has been copied to their computer.

Another approach would be to use a database lookup to determine whether the content is allowed to be shared. For example, music in the MP3 file format can be determined whether it can be shared by the ID3 song title tag. However, this solution does not scale. Specifically, every downloaded file needs to access and search this central database, and this database's access does not improve as the file becomes more popular. In addition, the approach can be bypassed by changing the file's title tag or filename, although this makes searching more difficult.

A desirable solution includes embedding data throughout the content in which the embedded data has any of the following roles. The embedded data can have an identifier that identifies the file as the content that the user desires. The embedded data can be analyzed in terms of continuity throughout the file to quickly demonstrate that the file is complete and not modified by undesirable content or viruses. An additional role is to identify the content as something that is allowed to be shared, or used to determine the level or type of sharing allowed, such as for subscription users only.

The embedded data may exist in the header or footer of the file, throughout the file as an out-of-band signal, such as within a frame header, or embedded in the content while being minimally perceived, most importantly without disturbing its function, also known as a watermark.

In the utilization of this embedded data, the computer from which the content to be downloaded (i.e. the uploading computer) can check to make sure the content is appropriate to be uploaded when the files (e.g., music files) on this computer are added to the central database and/or when the content is requested. Similarly, the downloading computer can also check that the requested content is appropriate before or during the downloading process. An appropriate file can be defined as any of the following: the content is allowed to be shared, i.e. it is not copyright material, the file is the correct content, and that the content is complete and does not contain any viruses.

DETAILED DESCRIPTION

Figure 1:
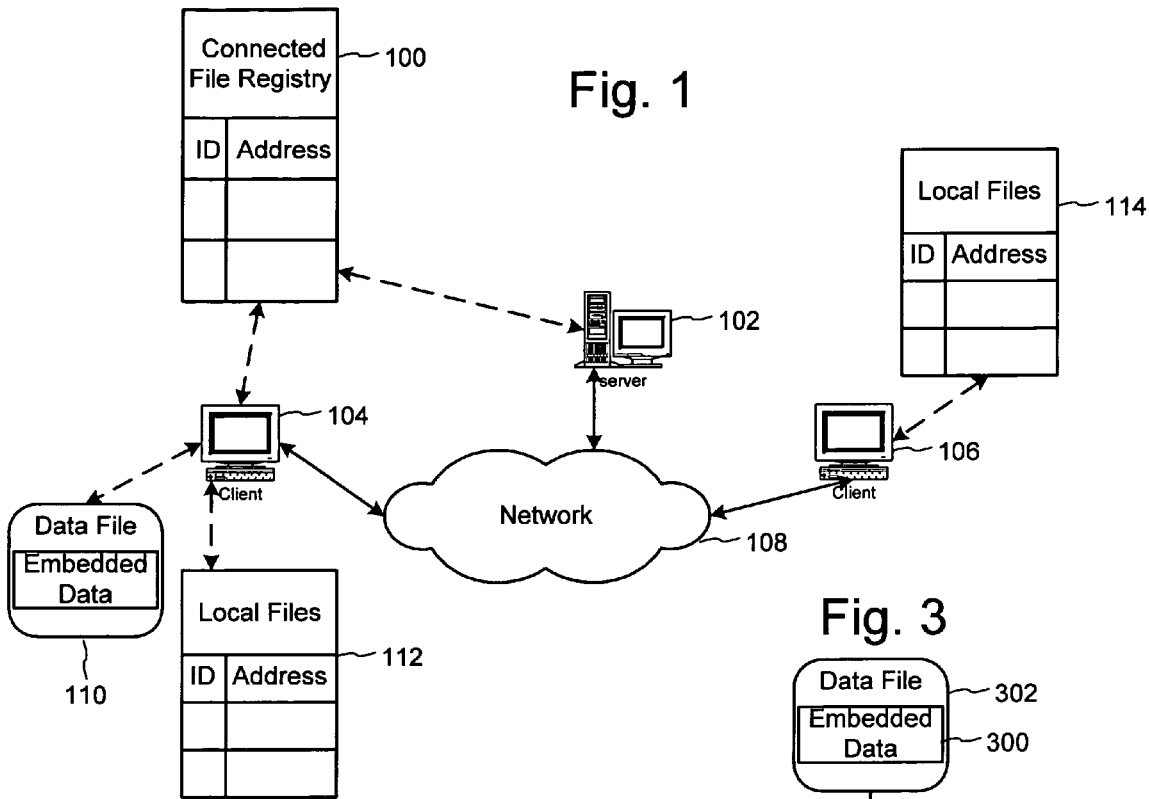
FIG. 1 is an overview of peer-to-peer file sharing system demonstrating locations at which embedded data can be used to control file-sharing.

The following sections describe systems and methods for using auxiliary data embedded in files to enhance file sharing systems. FIG. 1 depicts an example of a file sharing system for a computer network like the Internet. The solution described below uses data embedded in a file to identify a file as having content desired for downloading, to verify that the content of the file is complete and free of viruses, and to allow the file to be shared among users' computers at the user's share level. In many applications, an embedding process encodes auxiliary data in the file during creation, but it may also be embedded at a later time. For example, the file may be embedded (or re-embedded) as part of a file transfer process or electronic transaction where a user is granted usage rights for the file.

Figure 2:
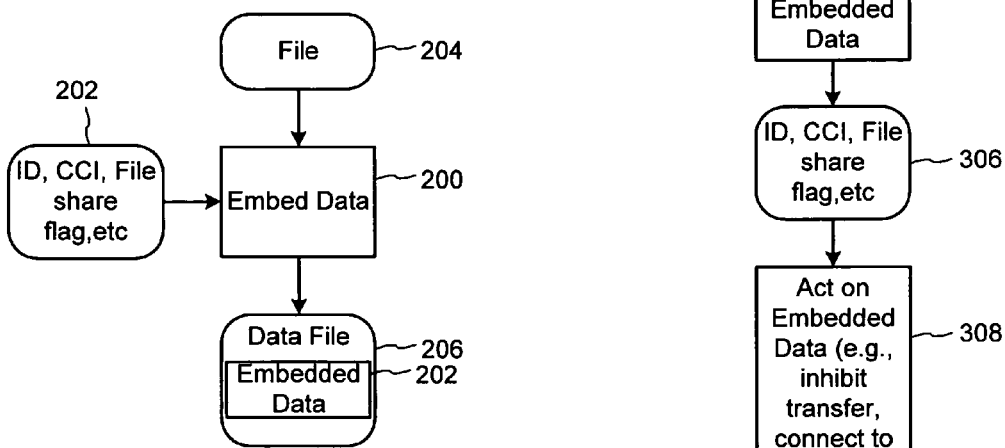
FIG. 2 is a flowchart of an embedding process.

FIG. 2 depicts an embedding process for adding auxiliary data to files in a file sharing system. A data embedding process 200 (e.g., steganographic encoder, file header encoder, data frame header encoder, etc.) embeds auxiliary data 202 in a file 204 to create a data file 206 including the embedded data 202. The file may then be distributed in a file sharing system comprising a number of computers or other devices in communication with each over via a network. The auxiliary data embedded in the file is used to manage file sharing operations, and to enhance the user's experience.

Types of Embedded Data

The embedded data can be placed in the header or footer of the file, throughout the file such as within frame headers, or hidden in the content itself using steganographic encoding technology such as digital watermarking. The file may contain any combination of text, audio, video, images and software, in compressed or uncompressed format.

Auxiliary data used to manage sharing of a file may be embedded in headers and footers of the file for each type. When the data is to be embedded throughout the file, the file can be broken into frames of known size, with a header for each frame including space for embedded data. For MPEG compressed audio and video, these frames already exist. The embedded data can be hidden in copyright, private or auxiliary bits. The data embedded in frame headers can be modified by the audio in any frame and/or encrypted (defined as dynamic locking in patent application Ser. No. 09/404,291, already incorporated by reference) to improve its robustness to duplication in another content file, a content bomb, or virus.

With respect to watermarking, there are many known techniques for embedding data within software, image, audio, video, and text in the state of the art, and new techniques will evolve, especially for software. Examples of steganographic encoding and decoding technologies are described in U.S. Pat. No. 5,862,260, and in co-pending patent application Ser. No. 09/503,881, filed Feb. 14, 2000. The watermark may exist only in one place in the content, several places in the content, or continuously throughout the content. For example, in an audio file, the watermark may be repeated in temporal segments of the audio track. In a still image, the watermark may be repeated in spatial segments of the image. In video, the watermark may be repeated in temporal or spatial segments of the video signal.

Roles of Embedded Data

The embedded data may include an identifier (ID) that serves as an index to an entry in a searchable database that describes or otherwise identifies the content of the file. For example, the database can include elements, where each element comprises an ID, song title, album (or CD) title, release year, and artist name. This database can be indexed by any of these elements, thus improving automated searching capabilities. Specifically, rather than needing to search for "Help and Beatles", "The Beatles—Help!", and so on, a unique ID can be used in a search query to identify The Beatles' song Help, and different IDs may be used for different releases.

The user, via an automated search program, only needs to submit a search query including that ID. When searching, the user may be presented with a drop down menu of titles of files from the database that satisfy the search query. The search program automatically knows the ID from the database so that the correct file can be found and downloaded from a computer at an address associated with that file in the database. In addition, these IDs could help music be searched by year, which is desirable to many people who want to hear music from their high school or college days.

In addition to facilitating automated searches for content in files, the ID may also be used to track these files. For example, the file transfer system can add the ID of a file to an event log when the file is transferred (e.g., downloaded, uploaded, etc.). The specific components of the file transfer system involved in the event logging process may vary with the implementation. Also, the time at which the event is triggered and logged may also vary.

The client system responsible for sending a file may issue and log an event, and either store the log locally, and/or send it to a central or distributed database for communication to other systems. The client system that receives the file may perform similar event logging actions. Additionally, if a server system is involved in a file transfer, it may also perform similar event logging actions. For example, the server may transfer the file, or facilitate the transfer between two clients, and as part of this operation, log an event of the operation including the file ID, the type of event, etc. In distributed systems where no central server is involved, the event logs can be stored on computers in the file sharing network (or a subset of the computers), and composite event logs can be compiled by having the computers broadcast their event logs to each other. Each computer, in this approach, could maintain a copy of the event log, which is synchronized upon each broadcast operation.

The embedded data, when continuously embedded throughout the content, can improve the reliability of the content by, for example, demonstrating that the content is complete and has no viruses. One way to make the embedded data continuous is to insert it in periodically spaced frame headers, or steganographically encode it at locations spread throughout the file.

A person trying to sabotage the file-sharing system can try to replicate the embedded data through a content bomb (such as audio repetitively saying "do not copy") or virus to fool the system. Thus, the harder it is to duplicate the embedded data, the more reliable the system is. When trying to resist duplication, it is advantageous to encrypt the embedded data payload, thus making it harder to duplicate. In addition, the embedded data payload can be modified by the content to improve resistance to duplication. Finally, the embedded data can be modified by the content and then encrypted for more secure applications. The above three robustness methods are labeled dynamic locking and disclosed in patent application Ser. No. 09/404,291, already incorporated by reference. When the embedded data is a watermark, meaning that it is steganographically embedded within the content and not just as auxiliary data in each frame, it is usually inherently robust to duplication because many watermarks use secret keys that are required to detect the watermark and read the information carried in it. One form of key is a pseudo-random noise (PN) sequence used as a carrier to embed, detect, and read the watermark. In particular, a spreading function is used to modulate the PN sequence with the watermark message. The resulting signal is then embedded into the host data (e.g., perceptual or transform domain data) using an embedding function. The embedding function modifies the host signal such that it makes subtle changes corresponding to the message signal. Preferably, these changes are statistically imperceptible to humans yet discernable in an automated steganographic decoding process. Encryption and changing the watermark message or PN sequence adaptively based on the content can improve the robustness of the watermark to duplication.

Importantly, header and footer structures should be of known size or protected so a hacker cannot slip a virus into the header or footer.

The embedded data can also demonstrate that the file is allowed to be shared, which means its owner has authorized copying (i.e. sharing) rights. The watermark message may include standard copy control information such as two message bits to encode copy permission states of "no more copy," "copy once" and "copy freely." In addition, only one bit can be used, thus indicating whether or not sharing, is allowed.

The copyright can be linked to other copy management systems. For example, according to the DVD-Audio specification (available at http://www.dvdforum.org) and the Portable Device Specification of the Secure Digital Music Initiative (available at http://www.sdmi.org), audio may be watermarked with copy control information. This information may automatically be passed along if encoded within a watermark robust enough to survive the compression used in most file-sharing systems. Alternatively, the watermark can be read and re-embedded as embedded data, possibly another type of watermark (as discussed in patent application Ser. No. 09/404,292, already incorporated by reference).

In addition, the copyright data can provide more information than just copy or not. For example, the bits may inform file sharing software, system or device that this file can be shared by subscription users, but not free users. Or, it can inform the level or type of subscription which allows sharing of the file. Specifically, subscription users who pay per month can share files that a free user cannot share. With music sharing, a popular band may allow only subscription users (or possibly users with an expanded subscription) to share their file so that they can earn revenue directly from the file. However, a new band may allow their song to be shared by all users.

Embedded Data Payload

The simplest form of the embedded data is a payload of one bit determining whether or not the file can be copied. A better payload is one with two bits for copy control and more bits, such as 32 bits, for a unique identifier that can be used to verify that the file contains the correct content. Note that demonstrating the file is complete does not depend upon the payload, but upon completeness of embedded data throughout the content. A decoding process can verify whether the file is complete by determining whether or not the embedded data is present at predetermined intervals or segments of the content. Finally, the payload can have a payload type, such as 8 bits, and then more bits, like 32 bits, of information that depends upon the document type and probably includes copy control and an identification section.

When the payload is to be continuously embedded with dynamic locking and it contains only a few bits, such as 1 bit, a system designer can easily convert the payload into a multi-bit payload for more secure dynamic locking. For example, the 1 bit payload can be represented by a 16-bit PN sequence, where a "1" is the 16-bit PN sequence and a "0" is the 16-bit complement, embedded over and over again.

General Utilization of Embedded Data for File-Sharing

Before using the embedded data in the file-sharing system, the embedded data has to be added to the content, as shown in FIG. 2. Usually, the embedded data will be added at the time of creation or purchase. Minimally, the embedded data includes a copy control bit, possibly repeated throughout the file. When repeated, the embedded data also demonstrates file continuity and completeness. Additionally, the embedded data may include an ID to identify the content.

Alternatively, the content can be watermarked when created or manufactured for public release. For perceptual content such as images, audio or video, the watermark is designed to survive the compression, such as used in a JPEG or MPEG format. Or if not made to survive certain types of compression or other processing, the watermark can be read and re-embedded in the compressed content. An advantage of the watermark is that it survives typical file conversion processes such as ripping content from a CD to another electronic file format, usually a compressed format. A related benefit is that the watermark obviates the need for the file conversion program or device to be responsible for ensuring that the embedded data remains with the content. In other words, the ripper does not need to have a decoder for the embedded data and does not need to act on embedded data.

The system, as shown in FIG. 1, may be implemented in three principal network architectures:

1. A client server model with a central database 100, like the Napster file sharing system. In this case, the database 100 is centralized on a server 102 or group of servers managed by one entity. To the clients (e.g., 104, 106) of the system, the server 102 presents a common interface for accessing and searching the database 100 and getting address information of desired files to facilitate file transfer between clients.
2. A distributed client model with a distributed database, like the Gnutella file sharing system. In this case, the database 100 is distributed among several different computers (e.g., 104, 106) on a network 108 and several copies of similar but slightly different databases may co-exist. Each database may be replicated on each client or on other computers on the network that the clients may access via conventional network communication protocols like TCP/IP and HTTP. When any registered user makes a change to one copy of the database, other copies of the distributed database may be updated using database synchronization.
3. A central server model where users upload the files to a central server 102 for downloading from there, without the server knowing what content is in the file. In other words, the central server is not moderated. The central server contains a database 100 of the files that have been uploaded and are available for downloading.

In all three architectures, in general, a client system downloads the file from another place (e.g., client 106 downloads a file 110 from client 104). In architectures (1) and (2), the other place is another user's computer, whereas in case (3) the other place is a central server. In each case, the database is searchable via an automated search program.

Figure 3:
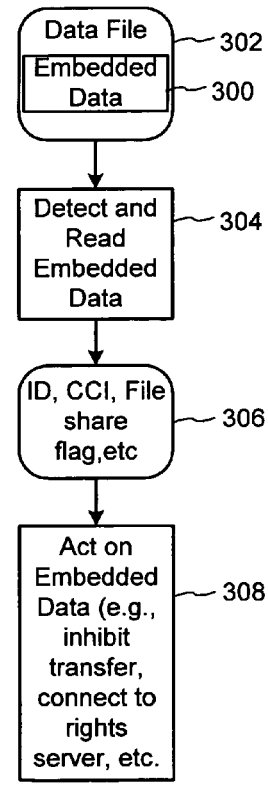
FIG. 3 is a flowchart of a detecting process.

FIG. 3 depicts a process for decoding embedded data from files in the file sharing system. For optimal scalability, the embedded data 300 is detected and read from a data file 302, by an embedded data decoding process 304 in the user's computer and not the network server. The decoding process, which is preferably integrated into client software of the file sharing system, returns the embedded data 306. The file sharing software in the client (and potentially on a server) then acts on the embedded data as depicted in block 308. The user's computer can be the uploading or downloading computer, or both, in architectures (1) and (2), whereas the user's computer is the downloading computer in architecture (3).

Alternatively, when registering files and a network address with the file-sharing database, the user's file sharing software can scan files for the embedded data to enable proper registration. Note that each user is provided with client software or firmware, which is provided electronically or on a portable storage device like an optical disk.

The database, for any of the above architectures, is searchable via an automated search program and maintains records of the files (MP3 files, software, documents, images, video, etc.) available for sharing from each registered user. In addition, each user may maintain a local database 112, 114 of files available for sharing, including file identifiers, other file related metadata, and address information indicating where the file resides on the user's computer system (104, 106). When the user connects to the file sharing system (e.g., connects to the network), this information is added to the database of files available for sharing (e.g., connected to file registry 100).

Both systems have a mechanism for communicating connectivity status of clients. In particular, the connectivity status indicates which clients are currently connected to the network, and are available to transfer registered files. The connectivity status information may be maintained in the same or a different database as the one that maintains records of files available for transfer along with the addresses of the clients where those files are available. The example shown in FIG. 1 shows that a database, called the connected file registry, stores identifiers and possibly other information about files available for sharing and connectivity information such as the addresses of the computers where the files reside.

All three architectures include a client system (104, 106) that acts as the interface to end users, and maintains the end user's copy of files available for sharing in the network architecture. The client system is capable of directly or directly communicating with the database 100 and is capable of obtaining connectivity status.

In one preferred embodiment, the content files such as audio, image and video files, have been marked with embedded data that conveys any or all of the following: file identification, file status, such as complete and virus free, and copy control information within the network architecture. The clients have an embedded data decoder that screens files for the presence of embedded data, and if found, determines whether the embedded data enables the desired action. Before sending or receiving a file as part of a file sharing process in the network architecture, the client checks the file transfer status and determines whether or not the file can and is the correct and complete file to be transferred.

One enhancement is to add a user interface to the client that informs the user of file transfer rights, and gives the user the opportunity to get rights that he or she desires. One way to get the rights is to connect to another computer and purchase a copy of the file with the desired file transfer rights. One way to enable this connection is to include an identifier (e.g., address, URL, name, etc.) or index to an identifier in the embedded data that instructs or otherwise enables the client to establish network communication with an e-commerce or rights transaction server. The purchased file may be transferred to the client electronically or physically shipped on packaged media, such as an optical disk, memory card, etc.

The user interface may also enable the user to get additional information about a file (e.g., a generic or customized copyright notice or other metadata) and to access another server that provides electronic purchase opportunities. For example, the user interface may facilitate a link to a server on the network that enables the user to buy a file of interest or related files. For music applications, the user can buy a music track or set of tracks, concert tickets, etc. via an electronic transaction between the client and an e-commerce server on the Internet.

Another way is to connect to another computer and purchase the rights, which in turn, are updated in the file by changing the embedded data in some fashion. The updated rights may be affected by encoding more embedded data, such as another watermark, or altering the existing embedded data, such as by removing it. Content providers or distributors pay the provider of the embedded data technology to encode files. In one embodiment, the files are watermarked at their time of creation. In addition, the content providers or distributors pay the provider of the embedded data technology per transaction when users purchase enhanced rights. There are a number of ways to track these transactions. The client software that performs encoding or decoding of the embedded data can keep a log of transactions and add the log to a central or distributed database of transactions. Alternatively, the transaction server that communicates the enhanced rights to the client can log the transaction event in a similar fashion.

Finally, if no embedded data exists, it is up to the client file sharing application to decide what to do.

Specific Example Utilization

In this specific example utilization, it is assumed that the embedded data has been added and dynamically locked (including being modified by the audio content and encrypted, as defined in patent application Ser. No. 09/404,291, already incorporated by reference) to the audio throughout the frames in all legitimate MP3 files at the time of creation. (Note that the embedded data could include an ID to identify the content and/or artist, such as could be created from CDDB's database, available at http://www.cddb.com, and incorporated by reference, but not included in this example.) For personal use, this may happen at the ripping stage, i.e. when content on an optical disk like a CD is converted into a MP3 file. For retail use, this may happen when the file is made available for sale, probably through a commercial ripper.

When a user enables a file sharing system (e.g., an enhanced version of the Napster file sharing system) to share a directory on his computer, client software on the user's computer searches for all MP3 audio files in locations (i.e. folders or directories) allowed by the user. For each audio file, the client software looks for embedded data placed throughout the frame headers of the MP3 file. The embedded data provides data that the file is allowed to be shared and is continuous from start to end. Since the embedded data is dynamically locked to the audio, thus extremely difficult to duplicate, it is presumed that no viruses or audio bombs have been substituted. Now, the client software establishes a connection with a central database, and transfers to the central database the artist and song title of each song due to its ID3 tags, that the file can be shared, and that it is a "safe" file. (Note that the artist and song title can be identified by the embedded data ID and a secondary database, as discussed above, but not implemented in this example.) In addition, if no embedded data exists, it is up to the application to decide whether to allow file sharing. The application would not want to display a "safe" icon.

Next, when the user is connected to the file sharing system, the central database activates his songs (e.g., adds them to the connected file registry 100). If someone else's search locates this user's songs, they can download the songs from his computer and know they have rights and that the song is "safe" by some identifying feature displayed in the UI of the client software, such as a "safe" icon.

However, if a user wants to foil the system, he may have tried to replace the file with a file of the same size and name. In this case, the client software can do any or all of the following to improve its reliability. It may want to verify that the embedded data still exists and is complete before allowing uploading. Or, the requesting/downloading client software may ask the user's client software for the embedded data. This uploading-side security and client-to-client exchange is more difficult to trick since it involves changing object code of the client software, but not impossible since the exchange includes using software available on the computer of the person desiring to sabotage the system. In addition, the requesting/downloading client application may want to check the embedded data as the file is downloaded. Bypassing this last downloading-side security feature is the most difficult since it happens on a computer not available to the person desiring to sabotage the system and the embedded data is secure.

In an alternative example, the embedded data could be a watermark placed in the original CD or DVD audio, and which survives compression and is used in other copy management systems, such as designed by DVD-A and the Secure Digital Music Initiative (SDMI). In this case, the enabling and usage of the file-sharing system would be similar. It is mainly the embedding process that is different.

Using the Embedded Data to Link to Additional Information or Actions

In addition to the roles of the embedded data described above, the embedded data may also be used to link additional information or actions to a file. For example, the embedded data may carry an address or an index to an address of additional information or a program related to the file. The embedded data may trigger the decoding application to fetch the additional information or execute the linked action automatically. Alternatively, the decoding application may present a user interface to the user, giving the user the option to instruct the computer to fetch additional information or launch a program associated with the file via the embedded data.

The additional information may be rendered to the screen (e.g., a web page, graphical image, video) or rendered to an audio output device (e.g., a sound clip). The additional information may represent a graphical brand identifier, copyright notice, web page or link to a web page, etc. Visual information or program instructions linked to a file may be used to create a user interface that controls how the user interacts with the file. The user interface may include graphical icons that act as hot links to web pages or programs, user interface controls that enable the user to control rendering or transfer of the file from which the embedded data was extracted. For example for a music file, the user interface controls could enable the user to control playback of the file. These user interface controls may create a unique user interface for each file or customize a media player, such as Windows Media Player, Real Player from Real Networks, WinAmp from America OnLine, for that file.

In one usage scenario, the client system extracts this embedded data and presents a user interface to the user asking him if he wants additional information about the file. In the case of a music file, the client system could display a link to additional information or a related action as the music file is being transferred or rendered. Specifically, the embedded data could be used as an index to a URL of a web site that provides more information or opportunities to buy the music or related products or services via an electronic transaction.

A database mapping embedded data to additional information or actions could be stored in the client system, a remote computer or device connected via a network, or a combination of both. The client system may be programmed to automatically look up corresponding information or actions in response to decoding the embedded data. The information or actions in this case may include displaying a user interface with links to additional information, programs, etc. (e.g., links to web sites, or programs that execute when the user selects the link). Alternatively, it may include fetching related information or programs that is rendered or executed automatically while the file is being transferred or rendered. For example, the embedded data in a music file might link to video or image data that is rendered as the music is being rendered. Also, the embedded data might also link to a web site where the user can buy the content, license usage rights in the content, or buy or purchase related content, products or services. For more information about these types of applications see co-pending patent applications and patent: U.S. Pat. No. 6,505,160 entitled Connected Audio and Other Media Objects filed May 2, 2000, and Ser. No. 09/571,422 entitled Methods and Systems for Controlling Computers or Linking to Internet Resources from Physical and Electronic Objects filed May 15, 2000, Ser. No. 09/574,726, entitled Methods and Systems Employing Digital Watermarking filed May 18, 2000, which are hereby incorporated by reference.

Using Fingerprints to Enhance Searching and Tracking of Files

Just as embedded data enhances file sharing systems, fingerprints can also provide additional functionality. Fingerprints refer to unique identifiers that are derived from the content of the file. For example, a fingerprint can be computed from an audio, image or video signal stored in a file by hashing the data representing that signal into a unique identifier. The unique identifiers for files are stored in a database that associates information, and in some cases, automated actions, with the unique identifiers. Such fingerprint technology is currently used to identify audio and video signals for broadcast monitoring applications, and can be used for applications described in this document.

Fingerprints may be computed for media files, like image, audio, and video files, and stored in a database along with information or actions associated with the files. This database enables files to be associated with related information or actions as described in the previous section.

For example, file sharing software executing on the client computes the fingerprint for a file recently received or sent in the file sharing system. As part of the file sharing process, the file sharing software computes the fingerprint and sends it to a database system, which is located at a central server or distributed in the file sharing network. In response, the database system returns related information, or performs an action related to the fingerprint, such as logging an event, linking to another computer (e.g., a web site that returns information to the sending or receiving computer, a licensing server that sends a web page to the sending or receiving computer with licensing information or usage control rules), streaming a media signal (e.g., streaming audio or video) to the sending or receiving computer, etc.

The fingerprint augments file searching and tracking in the system because files can be searched or tracked based on their fingerprint. For example, the user could instruct the file sharing system to return a list of related files to a file in question. In response, the file sharing software computes a fingerprint of the file in question, sends it to a search engine, which in turn, returns a list of files and related information linked to that fingerprint in a database. Also, to track usage or transfer of a file, the file sharing system can log the fingerprint of a file when it is transferred or used as described previously.

Concluding Remarks

Having described and illustrated the principles of the technology with reference to specific implementations, it will be recognized that the technology can be implemented in many other, different, forms. To provide a comprehensive disclosure without unduly lengthening the specification, applicant incorporates by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device). Additionally, content encoded with auxiliary data used in file sharing may be distributed on packaged media, such as optical disks, flash memory cards, magnetic storage devices, or distributed in an electronic file format.

The particular combinations of elements and features in the above-detailed embodiments are exemplary only; the interchanging and substitution of these teachings with other teachings in this and the incorporated-by-reference patents/applications are also contemplated.

The invention claimed is:

1. A method of controlling file-sharing in a file sharing system using embedded data, the method comprising:
    checking for the embedded data in a file designated for file sharing at a user's computer, and
    in response to finding the embedded data, instructing the user's computer to act according to the embedded data;
    wherein the user's computer interacts with the embedded data to control file-sharing in the file sharing system, and the embedded data includes an identifier of content in the file, the identifier serving as an index to an entry in a database that includes information about the file to enable searching for the file based on the information in the entry; the database indicating files available for sharing in the file sharing system.

2. A computer readable storage medium on which is stored instructions for performing the method of claim 1.

3. A method of controlling file-sharing in a file sharing system using embedded data, the method comprising:
    checking for the embedded data in a file designated for file sharing at a user's computer, wherein the embedded data includes data throughout the file that facilitates verification that the file is at least one of complete and free of a virus, and
    in response to finding the embedded data, instructing the user's computer to act according to the embedded data, including verifying that the file is at least one of complete and free of a virus, and indicating a result of the verifying;
    wherein the user's computer interacts with the embedded data to control file-sharing in the file sharing system.

4. The method of claim 3 in which the embedded data is modified by the content and encrypted to improve its robustness to impersonation.

5. The method of claim 3 in which the embedded data includes an identifier of the content to facilitate automated searching.

6. The method of claim 5 in which the embedded data includes data to determine whether content in the file can be shared.

7. A computer readable storage medium on which is stored instructions for performing the method of claim 3.

8. A method of controlling file-sharing in a file sharing system using embedded data, the method comprising:
    checking for the embedded data in a file designated for file sharing at a user's computer,
    determining from processing of the embedded data whether to allow transfer of the file to or from another computer in response to a request to share the file in the file sharing system
    and
    in response to the processing of the embedded data, instructing the user's computer to act according to the embedded data;
    wherein the user's computer interacts with the embedded data to control file-sharing in the file sharing system.

9. A computer readable storage medium on which is stored instructions for performing the method of claim 8.

10. A method of controlling file-sharing in a file sharing system using embedded data, the method comprising:
checking for the embedded data in a file designated for file sharing at a user's computer, and
in response to finding the embedded data, instructing the user's computer to act according to the embedded data;
wherein the user's computer interacts with the embedded data to control file-sharing in the file sharing system;
wherein the embedded data comprises a watermark embedded in content in the file, the watermark being embedded within the content by modifying the content with changes that are imperceptible to humans; and
wherein the watermark includes data used to control transfer of the file in the file sharing system.

11. The method of claim 10 in which the embedded data includes data throughout the file to facilitate verification that the file is at least one of complete and free of a virus.

12. The method of claim 11 in which the embedded data includes an identifier of content in the file to facilitate automated searching.

13. The method of claim 12 in which the embedded data includes data to determine whether content in the file can be shared.

14. The method of claim 10 in which the embedded data includes data to determine whether content in the file can be shared.

15. The method of claim 14 in which the embedded data includes a watermark embedded in content in the file that carries an identifier of the content facilitating automated searching of the content.

16. The method of claim 14 in which the embedded data is embedded throughout the file to facilitate verification that the file is at least one of complete and free of a virus.

17. The method of claim 16 in which the embedded data includes an identifier of content in the file to facilitate automated searching for the content.

18. The method of claim 10 in which the file is an audio file.

19. The method of claim 18 in which the user's computer checks content in the file for the embedded data before adding the file to a file-sharing database.

20. The method of claim 18 in which the user's computer checks content in the file for the embedded data before allowing the file to be downloaded.

21. The method of claim 10 in which the user's computer checks content in the file for the embedded data before adding the file to a file-sharing database.

22. The method of claim 10 in which the user's computer checks content in the file for the embedded data before allowing the file to be uploaded.

23. The method of claim 10 in which the user's computer checks content in the file for the embedded data before allowing the file to be downloaded.

24. A computer readable storage medium on which is stored instructions for performing the method of claim 10.

25. A method of controlling file-sharing in a file sharing system using embedded data, the method comprising:
checking for the embedded data in a file designated for file sharing at a user's computer, wherein the embedded data comprises a watermark embedded in content in the file, the watermark being embedded within the content by modifying the content with changes that are imperceptible to humans, and wherein the embedded data includes an identifier of content in the file, the identifier referencing a database providing information regarding availability of the file for sharing, and
in response to finding the embedded data, instructing the user's computer to act according to the embedded data;
wherein the user's computer interacts with the embedded data to control file-sharing of the file with the embedded data in the file sharing system.

26. A computer readable storage medium on which is stored instructions for performing the method of claim 25.

27. A method of controlling file-sharing in a file sharing system using embedded data, the method comprising:
checking for the embedded data in a file designated for file sharing at a user's computer, wherein the embedded data is a watermark and the file comprises an audio file, the watermark being embedded within the content by modifying the content with changes that are imperceptible to humans, and
in response to finding the embedded data, instructing the user's computer to act according to the embedded data;
wherein the user's computer interacts with the embedded data to control file-sharing of the file with the embedded data in the file sharing system, and wherein the user's computer checks content in the file for the embedded data before allowing the file to be uploaded.

28. A computer readable storage medium on which is stored instructions for performing the method of claim 27.

29. A method of controlling file-sharing using embedded data, the method comprising:
embedding data in a file before releasing the file for file-sharing,
checking for the embedded data in the file at a user's computer, and
having the user's computer act according to the embedded data; wherein the embedded data includes a digital watermark that carries an identifier, and the identifier serves as an index to an entry in a database that includes information about the file to enable searching for the file based on the information in the entry, the database indicating files available for sharing in the file sharing system.

30. A computer readable storage medium on which is stored software for performing the method of claim 29.

31. A file sharing system comprising:
a memory;
a file sharing client in communication with the memory and operable to locate a file available for sharing on one or more remote devices, and
an embedded data decoder in communication with the memory and operable to check the file for embedded data, and to instruct the file sharing client to act according to the embedded data; wherein the embedded data includes a digital watermark that carries an identifier, and the identifier serves as an index to an entry in a database that includes information about the file to enable searching for the file based on the information in the entry, the database indicating files available for sharing in the file sharing system.

32. The file sharing system of claim 31 wherein the embedded data includes control information operable to inhibit the file sharing client from transferring the file.

33. A method of controlling file-sharing in a file sharing system that includes a searchable database enabling users to search for files in the file sharing system, the method comprising:
receiving a search request including information about a file from a user of the file sharing system to find a file based on matching information about the file in the searchable database;
locating a file in response to the search request;
receiving a file transfer request for the located file; and transferring the located file to a device that made the file transfer request, wherein the located file includes embedded data in media content in the file, and wherein the embedded data includes a digital watermark that carries an identifier, and the identifier serves as an index to an entry in a database that includes information about the file to enable searching for the file based on the information in the entry.

34. A computer readable storage medium on which is stored instructions for performing the method of claim 33.

35. A method of controlling file-sharing in a file sharing system using embedded data, the method comprising:
   checking for the embedded data in a file designated for file sharing at a user's computer, wherein the embedded data includes data throughout the file that facilitates verification that the file is at least one of complete and free of a virus, and
   in response to finding the embedded data, instructing a computer to act according to the embedded data, wherein the computer interacts with the embedded data to verify the file,
   after checking the embedded data, notifying the file sharing system that the file has been verified.

36. The method of claim 35 in which the embedded data is modified by the content and encrypted to improve its robustness to impersonation.

37. A method of controlling file-sharing in a file sharing system using embedded data, the method comprising:
   checking for the embedded data in a file designated for file sharing at a user's computer, and
   in response to finding the embedded data, instructing the user's computer to act according to the embedded data;
   wherein the user's computer interacts with the embedded data to control file-sharing in the file sharing system, and wherein the embedded data includes an identifier of content in the file that facilitates automated searching for the file; and wherein the identifier serves as an index to an entry in a database that includes word descriptors about the file to enable searching for the file based on the word descriptors in the entry, the database indicating files available for sharing in the file sharing system.

38. A method of controlling file-sharing in a file sharing system using embedded data, the method comprising:
   checking for the embedded data in a file designated for file sharing at a user's computer, and
   in response to finding the embedded data, instructing the user's computer to act according to the embedded data;
   wherein the user's computer interacts with the embedded data to control file-sharing in the file sharing system, wherein the embedded data includes data used to determine whether to allow transfer of the file to or from another computer in response to a request to share the file in the file sharing system, and the data used to determine whether to allow transfer of the file includes or refers to a permission governing whether a user has rights sufficient to allow the transfer of the file.

* * * * *

UNITED STATES PATENT AND TRADEMARK OFFICE
CERTIFICATE OF CORRECTION

| | | |
|---|---|---|
| PATENT NO. | : 7,689,532 B1 | Page 1 of 1 |
| APPLICATION NO. | : 09/620019 | |
| DATED | : March 30, 2010 | |
| INVENTOR(S) | : Levy | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 439 days.

Signed and Sealed this
Eleventh Day of January, 2011

David J. Kappos
*Director of the United States Patent and Trademark Office*